Nov. 22, 1966 W. R. BAUER 3,287,535
SWITCH ACTUATOR AND COUPLING MEANS THEREFOR
Filed July 29, 1965 3 Sheets-Sheet 1
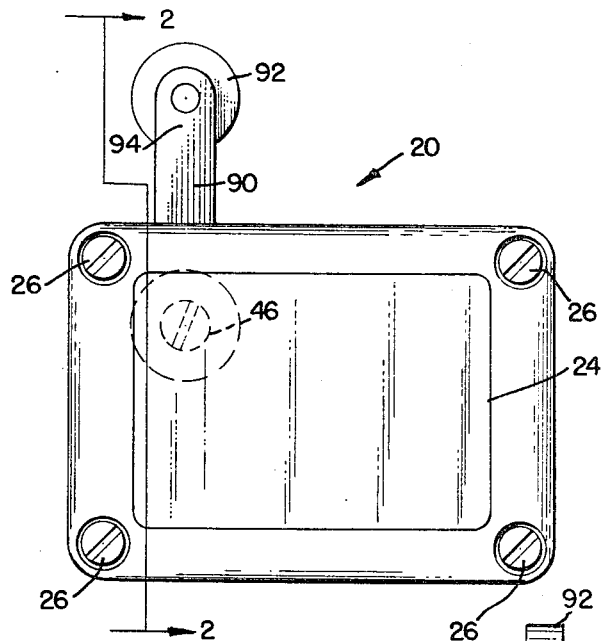
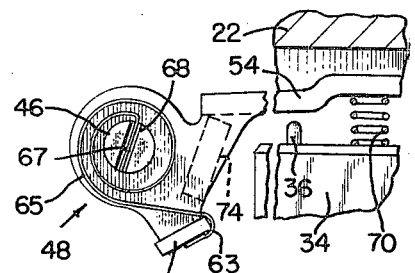
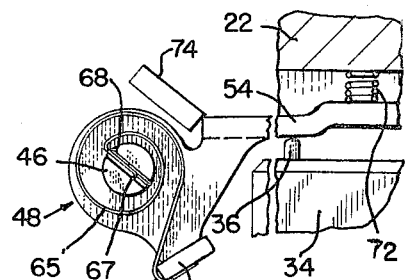
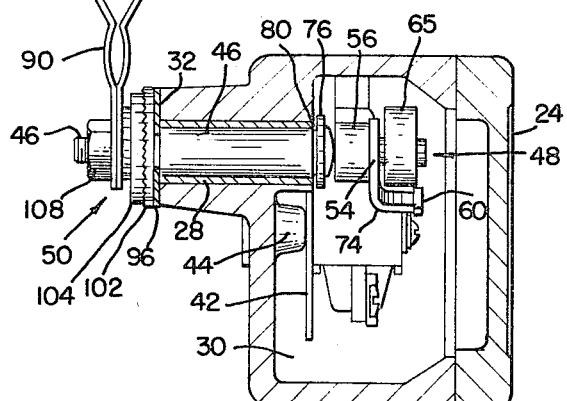
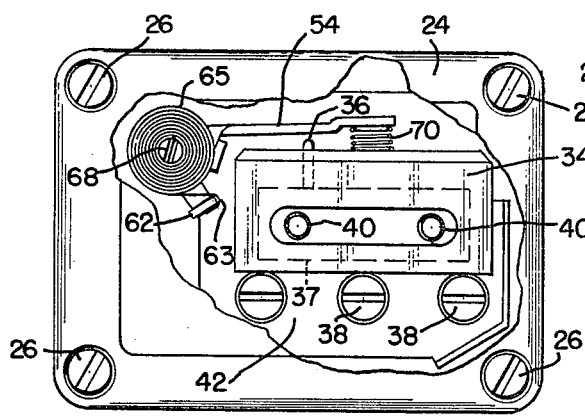
INVENTOR.
WERNER R. BAUER
BY
HIS ATTORNEYS

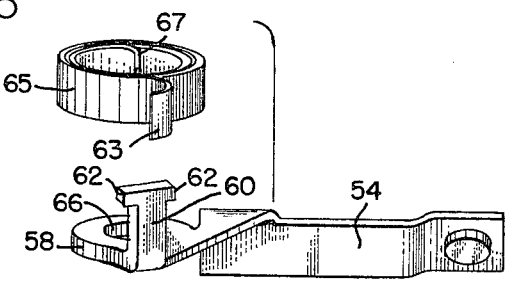
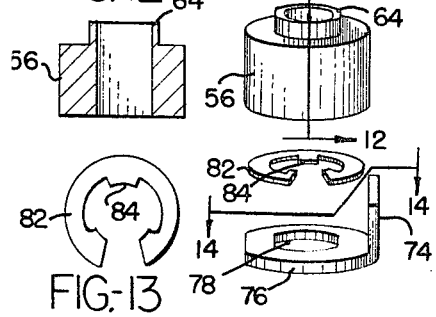
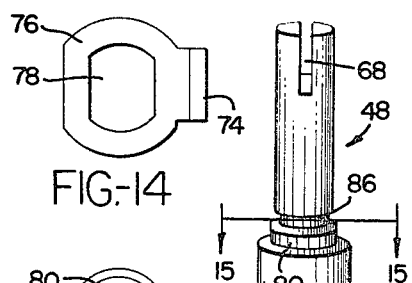
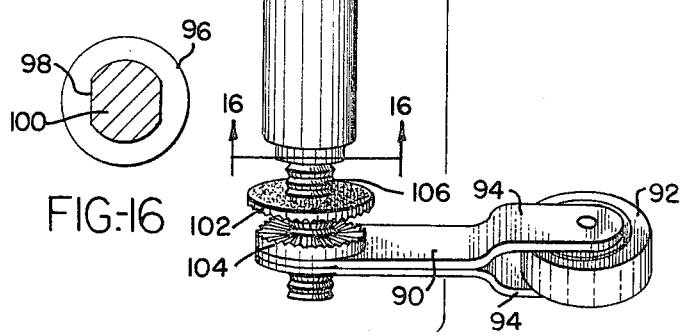
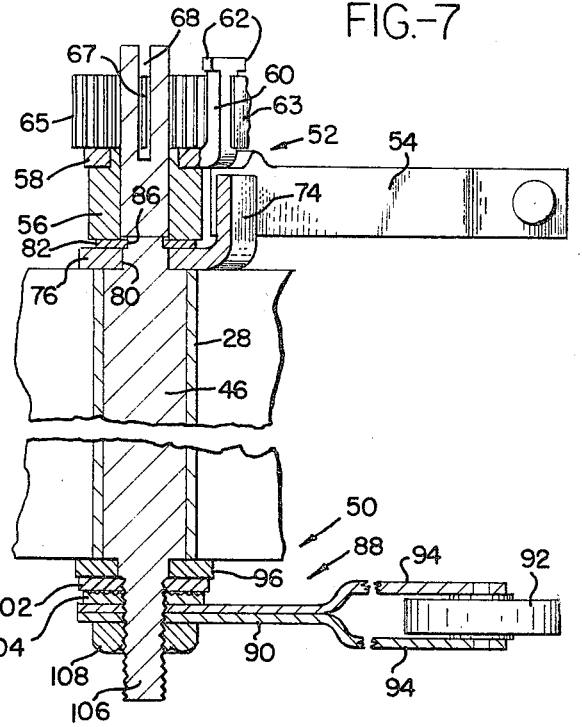
INVENTOR.
WERNER R. BAUER
BY
HIS ATTORNEYS

*INVENTOR.*
WERNER R. BAUER
BY
HIS ATTORNEYS

United States Patent Office 3,287,535
Patented Nov. 22, 1966

3,287,535
SWITCH ACTUATOR AND COUPLING
MEANS THEREFOR
Werner R. Bauer, Columbus, Ohio, assignor to Robertshaw Controls Company, Richmond, Va., a corporation of Delaware
Filed July 29, 1965, Ser. No. 475,642
8 Claims. (Cl. 200—168)

This invention relates to a switch actuator and coupling, and method of making the same.

One of the features of this invention includes a construction wherein the actuating parts for a switch can be easily assembled at the inner end of an actuator shaft, while such shaft is completely outside of a casing which is to contain such switch and actuating parts, and such shaft can then be inserted with the outside end of the shaft passing outwardly through a cylindrical shaft bearing on such casing, so that such outside shaft end may then have shaft oscillating means secured to such outside end outside of such casing.

Another feature of this invention includes a construction in which a coil spring surrounds the inner shaft end with one spring end secured to such inner shaft end, and with the other spring end engaging an actuating lever that is loosely and relatively rotatably held on such inner shaft end.

Other features of this invention becomes apparent from this description, the appended claimed subject matter, and the accompanying drawings in which:

FIGURE 1 is a front elevation of a switch construction according to this invention.

FIGURE 2 is a view, partly in section, and partly in elevation, taken along the line 2—2 of FIGURE 1.

FIGURE 3 is a view of a part of FIGURE 1, with part of the cover broken away.

FIGURE 4 is a diagrammatic view of certain actuator parts ready for clockwise actuation of the shaft of FIGURE 3, to produce an actuation of the switch plunger.

FIGURE 5 is a view similar to FIGURE 4 but showing a different embodiment, in which the actuator parts are ready for counterclockwise actuation of the shaft of FIGURE 3 and release of the switch plunger.

FIGURE 6 is an exploded, perspective view of certain parts of the switch construction.

FIGURE 7 is an enlarged cross-section of the cavity end of the actuating shaft and certain parts attached thereto, in cross-section.

FIGURE 8 is an enlarged cross-section of the outside end of the actuating shaft and certain parts attached thereto, in cross-section, FIGURE 8 being aligned with FIGURE 7, but being taken in a different plane from the plane of FIGURE 7.

FIGURE 12 is a cross-section taken along line 12—12 of FIGURE 6.

FIGURES 13-16 are views taken respectively along lines 13—13, 14—14, 15—15, and 16—16 of FIGURE 6.

Figure 10:
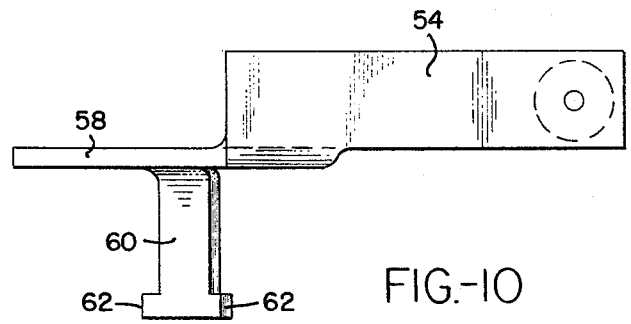
FIGURE 10 is a view taken from upper side of FIGURE 9.

Certain words are used in this specification and claimed subject matter which indicate direction, relative position, etc. These words are used for the sake of clearness and brevity. However, it is to be understood that such words are used only in connection with the direction, relative position, etc., of the parts as shown in the drawings, and that in actual use, such direction, and relative position, etc., may be entirely different.

This invention is particularly useful as an explosion proof switch construction, which may be used in an atmosphere that contains explosive gases and the like, without transmitting the spark danger to the atmosphere which surrounds the casing.

According to this invention, a casing 20 may include a casing main body 22 and a casing cover 24. The casing cover 24 may be secured to the main body 22 by means of the screws 26.

The casing main body 22 may be provided with a cylindrical shaft bearing 28, which extends from a switch cavity 30 in the main body 22 to the outside of such casing 20, such as to an outer surface 32 of the casing 20.

Switch means 34 may be mounted in the switch cavity and may have a switch actuatable means or plunger 36. The plunger 36 may be actuated to change the circuit control means 37 in the switch means 34.

The switch means 34 may be any of the well-known small unitary switch constructions now on the market which have insulated small casings with an actuating plunger or the like, and contain switch structures 37 therein which are actuated and deactuated by the plunger 36. The switch structures 37 may be connected to the electric line connectors 38 to which electric lines may be connected. Such electric lines may be connected to the outside of the casing 20 by suitably sealed outlet means not shown. Such electric lines are therefore electrically connected to the circuit controlling switch means 37 inside the small casing of the switch 34. Such switch means 34 may also be secured by screws 40 to a supporting plate 42, which is mounted on the casing ridge 44, which is part of the casing main body 22. The electric lines may also be connected to a power supply and to devices to be controlled or energized by the switch means 37.

A shaft 46 is rotatably oscillatable in the bearing 28. Such shaft 46 may have an inner or cavity shaft end 48 located in the cavity 30, and an outside shaft end 50, which may extend outside of the casing 20.

An actuating arm means 52 may be loosely rotatable about the shaft 46, and may extend laterally from such shaft in the form of a switch plunger actuating lever 54. Such actuating arm means 52 may also have a rotatably oscillatable bearing construction or block 56 around the shaft 46, which is fixed to the plunger actuating lever 54, which lever 54 is a means to actuate and deactuate the switch actuable means or plunger 36.

Figure 9:
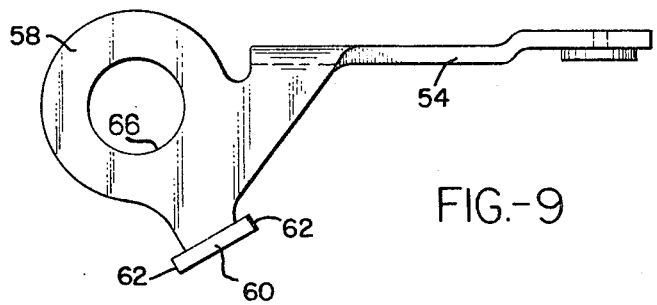
FIGURE 9 is a plan view of an actuator part shown in FIGURE 2-8.
Figure 11:
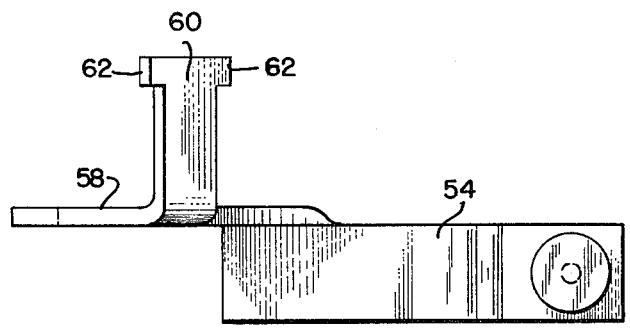
FIGURE 11 is a view taken from lower side of FIGURE 9.

The actuating arm means 52 may include a one piece stamping, such as shown in FIGURES 9–11. This stamping includes the plunger actuating lever 54, a shaft encircling plate 58, and a spring engaging lever 60.

The spring engaging lever 60 may be provided with spring locking means or flanges 62, which lock the spring end 63 against axial movement or axial disengagement from such lever. The spring end 63 may be the end of a spiral coil spring 65, which may be of spiral leaf strip coil construction. The other or inner end 67 of the coil spring 65 is torsionally fixed to the shaft 46 by inserting such spring end 67 in the slot 68 of the shaft 46.

The spiral spring construction 65 may be of a more closely wound spiral spring as shown in FIGURE 3. However, in other figures, such as FIGURES 4 and 5, the spiral 65 is diagrammetically shown with the coils widely spaced apart more clearly to show the direction of the spiral winding.

The bearing or block 56 may be rigidly secured to the plate 58 by inserting the narrow circular flange 64 of the block 56 into the opening 66 in the plate 58 and thereafter spreading or upsetting the end of the flange 64, rigidly attached to the bearing or block 56 to the plate 58 and thereby indirectly rigidly attach the actuating lever 54 to such bearing 56.

Therefore, the coil spring 65 surrounds the inner or cavity shaft end 48 with one spring end 67 secured to the cavity shaft end 48 in slot 68 and with the other spring end 63 engaging the spring engaging lever 60. The result is that the spring tension of the coil spring 65 is varied whenever the shaft 46 is oscillatably rotated, while the switch plunger actuating lever 54 is arrested either by the plunger 36, or by the additional spring 70, in FIGURES 3 and 4, or by the additional spring 72 in FIGURE 5. The particular cooperation between the coil spring 65 and the additional springs 70 and 72, and certain other parts, will become apparent elsewhere. Such plunger actuating lever 54 may also be arrested by an arm rotating lever 74.

The arm rotating lever 74 engages the lever 54 under certain conditions of the shaft 46, such as shown in FIGURES 4 and 5.

The lever 74 is fixed to the shaft 46, for example, in the following manner. The lever 74 may be made integral with the disc 76. The disc 76 may have an irregularly shaped hole 78, which fits over and locks with the irregularly formed portion 80 of shaft 46, so that oscillation of the shaft 46 causes oscillation of the disc 76 and its attached lever 74.

The disc 76 is locked in place on the irregular portion 80 by means of the snap-on lock washer 82 which has its tongues 84 held and inserted in the small shaft groove 86. By this construction the arm rotating lever means 74 is fixed to the shaft 46 and engages and disengages the actuating arm means 54 to rotate such arm means about the shaft 46, and/or to permit the shaft 46 to move relatively to the actuating arm means 54.

A shaft oscillating means 88 is secured to the outside end 50 of the shaft 46. This oscillating means 88 may be of any suitable construction to produce rotation oscillations in the shaft 46 to control the operation of the switch means 34 in any suitable manner. For example, a rockable arm 90 may be fixed to the outside shaft end 50 in any suitable manner to insure position rocking of the shaft 46. The arm 90 may be provided with a roller 92, which is rotatably held in the fork 94. The roller 92 may be actuated back and forth, by any suitable cam construction, not shown, which may be part of a program control system, and the like, or the roller 92 may be a handle or the like or may be a connecting rod connection or the like which produces the desired oscillation back and forth to rock the shaft 46 as desired.

By way of example, the arm 90 may be secured to the shaft 46 by a construction which may include a disc 96 with an irregular opening 98, which may be inserted over the irregularly shaped portion 100 of the shaft 46. One or more rough surfaced, knurled, or toother discs 102 and 104 may be mounted over the screw threaded portion 106 of the shaft end 50 in a manner to prevent relative rotation between the shaft 46 and arm 90. The lever 90 may be welded or the like to the disc 104. The disc 104 may be fixed to the disc 102 by the toothed construction illustrated. The disc 102 may be fixed to the disc 96 by the upper rough surface illustrated on disc 102, or by a toothed surface inter-engagement similar to that illustrated between discs 102 and 104. The disc 96 is rotationally fixed to the shaft 46 by the irregular opening 98 and irregular shaft construction 100 illustrated in FIGURE 16. If desired, the disc 102 also may have an irregular opening and irregular shaft engagement similar to that illustrated in FIGURE 16, to insure positive engagement between the arm 90 and shaft 46. These constructions may be held and locked on the shaft end 106 by any suitable lock nut construction 108.

In the construction shown in FIGURES 3 and 4, the parts are shown in normal or unactuated position. Oscillation of the shaft 46, and the lever 90, in a clockwise direction, as viewed in FIGURES 1, 3 and 4, causes the plunger actuating lever 54 to move from the illustrated position to actuate, or push in the plunger 36 to change the circuit characteristics within the switch means 34. In the position shown in FIGURE 4, the shaft 46 has not yet been actuated clockwise, but will be so actuated, at some future time. In the position of FIGURE 4, either the lever 74, and/or the spring 70 maintain the lever 54 from actuating the plunger 36. The strength of the spring 70, at this time, may be greater in torsional relationship with the shaft 46 than is the coil spring 65. When the shaft 46 is moved clockwise, the spring end 67 likewise is twisted clockwise and increases the torsion of the spring 65, which in turn causes the spring end 63 to pull the lever 60 clockwise, which in turn pulls the lever 54 down, so that it pushes the switch plunger 36 in and actuates the switch means 37. By this clockwise actuation of shaft 46, the arm 74 is rotated clockwise along with the shaft 46, to which it is fixed, so that it allows the plunger actuating lever 54 to move down and actuate the plunger 36. However, when the shaft 46 is returned to the position shown in FIGURE 4, the tension in spring 65 is reduced, and the lever 74 may engage the lever 54, and lift the lever 54 off the plunger 36 and thus deactuate the switch means 37.

If desired, however, the spring 65 may be changed, so that the shaft 46 may be actuated counterclockwise, as shown in FIGURE 5, from its normal position. In FIGURE 5, which is the normal position before actuation, the lever 74 engages the lever 54 and causes it to hold the switch plunger 36 down, in actuated position, as shown in FIGURE 5. The spring 65' may be the same spring which is shown in FIGURE 4, but has been rotated about a transverse axis and has been placed on the shaft 46 with its opposite edge down, so that the spiral is spirally wound in an opposite direction with respect to the shaft 46, as is evident from FIGURE 5. The hook end 63' is hooked on the other side of the lever 60. In position of FIGURE 5, the lever 74 positively pushes the lever 54 down and holds the plunger 36 in its down position. However, when the shaft 46 is rocked counterclockwise, as viewed in FIGURES 1 and 5, then the lever means 74 will be positively rotated counterclockwise, since it is fixed to the shaft 46 as previously described. The torsion of the coil spring 65' acting at the end 63', causes the lever 60 to be urged counterclockwise, to lift the lever 54 upward and away from the plunger 36, to allow the plunger 36 to extend upwardly to its outermost position, to deactuate the switch construction in unitary switch 34.

It is therefore to be seen that in FIGURE 4, the normal position of the parts is such that the plunger 36 is in its up position and not actuated, and later the plunger 36 is actuated to its down or inner position by clockwise rocking of the shaft 46. On the other hand, in FIGURE 5, the normal position is such that the plunger 36 is normally pushed down and is held in its down position by the lever 54, which is positively held in a down position by the lever 74. However, when the shaft 46 is rocked counterclockwise from the illustrated position of FIGURE 5, then the lever 74 will be lifted from the lever 54 and the tension of the coil spring 65' will cause the lever 54 to follow upwardly and allow the switch plunger 36 to move up to its uppermost position, to deactuate the switch parts in unitary switch 34.

It is thus to be seen that an improved construction has been provided in which all of the actuating parts for the switch means 34 may be assembled on the inner or cavity end 50 of the shaft 46 while the shaft 46 is completely outside the cavity 30 of the casing 20. With the cover 24 removed from the main body 22 of the casing, the shaft 46 can then be inserted into the sleeve 28 from the right hand end in FIGURE 2, so that the outside shaft end 50 passes through the bearing 28 from the cavity 30 to the outside portion 32 of the casing 22. Thereafter, the rockable arm 90 may be fixed to the outside end 50 of the shaft 46 by any suitable construction, such as that previously described, and may be secured thereon by the lock nut construction 108. It is not necessary to assemble the parts on the inner end of shaft 46 in the cramped quarters of the cavity 30 within the main body 22 of the casing, since these parts may be assembled on the shaft 46 while the shaft is outside the cavity 30. Such assembly of the parts may be made without being cramped by the main casing body 22, and before such shaft 46 is inserted in the cavity 30. This is of great advantage in assembling the switch construction. After the shaft has been pushed through the bearing 28 and the actuating parts have been placed in the cavity 30, along with the shaft 46, then the cover 24 may be applied and secured on the main casing body 22 by the screws 26.

This invention supplies a very efficient and simple switch construction and method of making the same.

A new, useful and unobvious construction is thus provided.

While the form of the invention now preferred has been disclosed as required by statute, other forms may be used, all coming within the scope of the claimed subject matter which follows.

What is claimed is:

1. In combination:
    a casing having a switch cavity with a cylindrical shaft bearing means extending from said cavity to an outer surface of said casing;
    a switch means in said cavity having switch actuatable means to change circuit control means in said switch means;
    a shaft rotatably oscillatable in said bearing and having a cavity shaft end extending into said cavity and having an outside shaft end extending outside said casing;
    an actuating arm means loosely rotatable about and extending laterally from said shaft, having a rotatably oscillatable bearing around said shaft, and having means to actuate and deactuate said switch actuatable means;
    a spring engaging lever rigidly secured to said actuating arm means;
    a coil spring surrounding said cavity shaft end with one spring end secured to said cavity shaft end and with the other spring end engaging said spring engaging lever;
    an arm rotating lever means fixed to said shaft and engaging and disengaging said actuating arm means oscillatably to rotate said arm means about said shaft;
    and shaft oscillating means secured to said outside end of said shaft;
    said outside shaft end insertable through said bearing means from said cavity outward to the outside of said casing while said actuating arm means, said spring engaging lever, said coil spring, and said arm rotating lever means are carried by said shaft, said shaft oscillating means securable to said outside shaft end after said outside shaft end has been inserted through said bearing means.

2. A combination according to claim 1 in which said one spring end is keyed to said cavity shaft end.

3. A combination according to claim 1 in which said other spring end is hooked to said spring engaging lever.

4. A combination according to claim 1 in which said one spring end is keyed to said cavity shaft end and in which said other spring end is hooked to said spring engaging lever.

5. A combination according to claim 4 in which said spring engaging lever has spring locking means to lock said other spring end to prevent axial disengagement of said other spring end from said spring engaging lever.

6. A combination according to claim 5 in which said coil spring is a spiral leaf strip coil spring.

7. A combination according to claim 6 in which said casing has a main casing body with said cavity and said cylindrical shaft bearing in said main casing body and in which said casing has a casing cover which covers and uncovers said cavity, said cover being removable to permit said outside shaft end to be inserted through said bearing means, said cover securable to said main casing body after said outside shaft end has been inserted through said shaft bearing.

8. In combination:
    a casing having a main casing body with a switch cavity and with a cylindrical shaft bearing means extending from said cavity to an outer surface of said casing main body;
    a casing cover engaging said main casing body and enclosing said cavity;
    a unitary switch construction with an actuatable member extending from said switch construction to change circuit control means in said switch construction;
    means mounting said unitary switch construction in said main casing body;
    a shaft rotatably oscillatable in said bearing and having a cavity shaft end extending into said cavity and having an outside shaft end extending outside said main casing body;
    an actuating arm loosely rotatable about and extending laterally from said shaft and actuating and deactuating said actuatable member;
    a coil spring surrounding said shaft with one spring end secured to said shaft and with the other spring end producing a torsional force on said actuating arm;
    arm rotating means fixed to and moved by said shaft and engaging and disengaging said actuating arm oscillatably to rotate said arm about said shaft;
    and shaft oscillating means secured to said shaft outside said main casing body;
    said outside shaft end insertable through said bearing means while said casing cover is removed from said main casing body, from said cavity outward to the outside of said casing while said actuating arm means, said coil spring and said arm rotating means are carried by said shaft, said shaft oscillating means securable to said outside shaft end after said outside shaft end has been inserted through said bearing means, and said casing cover securable to said main casing body after said outside shaft end has been inserted through said bearing means.

References Cited by the Examiner

UNITED STATES PATENTS

| | | | |
|---|---|---|---|
| 2,210,793 | 8/1940 | Butler | 200—47 X |
| 2,474,945 | 7/1949 | Johnson | 200—47 X |
| 2,817,736 | 12/1957 | Bastian | 200—168 |
| 2,822,439 | 2/1958 | Schaefer et al. | 200—47 X |

ROBERT K. SCHAEFER, *Primary Examiner.*